US008463996B2

(12) United States Patent
Olukotun

(10) Patent No.: US 8,463,996 B2
(45) Date of Patent: *Jun. 11, 2013

(54) MULTI-CORE MULTI-THREAD PROCESSOR CROSSBAR ARCHITECTURE

(75) Inventor: Kunle A. Olukotun, Stanford, CA (US)

(73) Assignee: Oracle America, Inc., Redwood City, CA (US)

( * ) Notice: Subject to any disclaimer, the term of this patent is extended or adjusted under 35 U.S.C. 154(b) by 1678 days.

This patent is subject to a terminal disclaimer.

(21) Appl. No.: 10/855,694

(22) Filed: May 26, 2004

(65) Prior Publication Data

US 2006/0136605 A1    Jun. 22, 2006

Related U.S. Application Data

(60) Provisional application No. 60/496,602, filed on Aug. 19, 2003.

(51) Int. Cl.
*G06F 12/00* (2006.01)
*G06F 13/00* (2006.01)

(52) U.S. Cl.
USPC .......... 711/118; 711/100; 711/151; 711/154; 711/165; 710/113; 710/119

(58) Field of Classification Search
USPC .......... 711/100, 118, 151, 154, 165; 710/19, 710/113, 119, 309, 240
See application file for complete search history.

(56) References Cited

U.S. PATENT DOCUMENTS

| | | | |
|---|---|---|---|
| 4,627,050 A * | 12/1986 | Johnson et al. | 370/363 |
| 5,526,510 A | 6/1996 | Akkary et al. | |
| 5,895,487 A | 4/1999 | Boyd et al. | |
| 5,968,167 A | 10/1999 | Whittaker et al. | |
| 6,085,276 A * | 7/2000 | VanDoren et al. | 710/240 |
| 6,209,020 B1 | 3/2001 | Angle et al. | |
| 6,223,240 B1 * | 4/2001 | Odenwald et al. | 710/311 |
| 6,480,927 B1 | 11/2002 | Bauman | |
| 6,553,460 B1 * | 4/2003 | Chopra et al. | 711/125 |
| 6,557,070 B1 | 4/2003 | Noel | |
| 6,789,173 B1 * | 9/2004 | Tanaka et al. | 711/147 |
| 2002/0027557 A1 * | 3/2002 | Jeddeloh | 345/519 |
| 2002/0188807 A1 * | 12/2002 | Chaudhry et al. | 711/128 |
| 2003/0088610 A1 | 5/2003 | Kohn et al. | |
| 2003/0163649 A1 * | 8/2003 | Kapur et al. | 711/146 |
| 2004/0030845 A1 * | 2/2004 | DeLano et al. | 711/150 |

FOREIGN PATENT DOCUMENTS

WO    WO 03/036482       5/2003
WO    WO03036482 A2 *    5/2003

OTHER PUBLICATIONS

Olukotun et al., "*The Case for a Single-Chip Multiprocessor*", Sep. 1996, ACM Sigplan Notices, ACM, Association for Computing Machinery, New York, NY, US, pp. 2-11, XP000639220.

* cited by examiner

*Primary Examiner* — Tuan V. Thai
(74) *Attorney, Agent, or Firm* — Martine Penilla Group, LLP

(57) ABSTRACT

A processor chip is provided. The processor chip includes a plurality of processing cores where each of the processing cores being multi-threaded. The plurality of processing cores are located in a center region of the processor chip. A plurality of cache bank memories are included. A crossbar enabling communication between the plurality of processing cores and the plurality of cache bank memories is provided. The crossbar includes a centrally located arbiter configured to sort multiple requests received from the plurality of processing cores and the crossbar is defined over the plurality of processing cores. In another embodiment, the processor chip is oriented so that the cache bank memories are defined in the center region. A server is also included.

19 Claims, 6 Drawing Sheets

MULTI-CORE MULTI-THREAD PROCESSOR CROSSBAR ARCHITECTURE

CROSS REFERENCE TO RELATED APPLICATIONS

This application claims priority from U.S. Provisional Patent Application No. 60/496,602 filed Aug. 19, 2003 and entitled "WEB SYSTEM SWERVER DESIGN SPECIFICATION". This provisional application is herein incorporated by reference.

BACKGROUND OF THE INVENTION

1. Field of the Invention

This invention relates generally to servers and more particularly to a processor architecture and method for serving data to client computers over a network.

2. Description of the Related Art

With the networking explosion brought along with introduction of the Internet, there has been a shift from the single thread desktop applications for personal computers to server applications that have multiple threads for serving multiple clients. Electronic commerce has created a need for large enterprises to serve potentially millions of customers. In order to support this overwhelming demand, the serving applications require different memory characteristics than the memory characteristics for desktop applications. In particular, the serving applications require large memory bandwidth and large cache memory requirements in order to accommodate a large number of clients.

In addition, conventional processors focus on instruction level parallelism. Therefore, the processors tend to be very large and the pipeline is very complex. Consequently, due to the complexity of the pipeline for processors, such as INTEL processors, only one core is on the die. Accordingly, when there is a cache miss or some other long latency event, there is usually a stall that causes the pipeline to sit idle. Serving applications are generally constructed to be more efficient with very little instruction level parallelism per thread. Thus, the characteristics of implementation for conventional processors with the application of serving workloads result in a poor fit since conventional processors focus on instruction level parallelism.

Additionally, the performance of processors based on instruction level parallelism (ILP), as a function of die size, power and complexity, is reaching a saturation point. Conventional ILP processors include well known processors from the PENTIUM™, ITANIUM™, ULTRASPARC™, etc., families. Thus, in order to increase performance, future processors will have to move away from the traditional ILP architecture.

In view of the forgoing, there is a need for a processor having an architecture better suited for serving applications in which the architecture is configured to exploit multi-thread characteristics of serving applications.

SUMMARY OF THE INVENTION

Broadly speaking, the present invention fills these needs by providing a processor having an architecture configured to efficiently process server applications. It should be appreciated that the present invention can be implemented in numerous ways, including as an apparatus, a system, a device, or a method. Several inventive embodiments of the present invention are described below.

In one embodiment, a processor chip is provided. The processor chip includes a plurality of processing cores where each of the processing cores being multi-threaded. The plurality of processing cores are located in a center region of the processor chip. A plurality of cache bank memories are included. A crossbar enabling communication between the plurality of processing cores and the plurality of cache bank memories is provided. The crossbar includes a centrally located arbiter configured to sort multiple requests received from the plurality of processing cores and the crossbar is defined over the plurality of processing cores.

In another embodiment, a processor chip is provided. The processor chip includes a plurality of cache bank memories located in a center region of the processor chip. A plurality of processing cores are provided. Each of the processing cores are multi-threaded and the plurality of processing cores are located outside of the center region. A crossbar enabling communication between the plurality of processing cores and the plurality of cache bank memories is included. The crossbar includes a centrally located arbiter configured to sort multiple requests received from the plurality of processing cores. The crossbar is defined between the plurality of processing cores and the plurality of processing cores.

In yet another embodiment, a server is provided. The server includes an application processor chip. The application processor chip includes a plurality of cache bank memories located in a center region of the processor chip. The application processor chip further includes a plurality of processing cores. Each of the processing cores are multi-threaded and the plurality of processing cores are located outside of the center region. A crossbar enabling communication between the plurality of processing cores and the plurality of cache bank memories is provided. The crossbar includes a centrally located arbiter configured to sort multiple requests received from the plurality of processing cores. The crossbar is defined between the plurality of processing cores and the plurality of processing cores.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for a layout configuration for a multi-thread multi core processor. It will be obvious, however, to one skilled in the art, that the present invention may be practiced without some or all of these specific details. In other instances, well known process operations have not been described in detail in order not to unnecessarily obscure the present invention.

The embodiments described herein define an architecture for multiple simple cores on a chip, where each of the cores have their own first level cache and the cores share a second level cache through a crossbar. Additionally, each of the cores have two or more threads. Through multi-threading, latencies due to memory loads, cache misses, branches, and other long latency events are hidden. In one embodiment, long latency instructions cause a thread to be suspended until the result of that instruction is ready. One of the remaining ready to run threads on the core is then selected for execution on the next clock (without introducing context switch overhead) into the pipeline. In one embodiment, a scheduling algorithm selects among the ready to run threads at each core. Thus, a high throughput architecture is achieved since the long latency event is performed in the background and the use of the central processing unit is optimized by the multiple threads. Therefore, the embodiments described below provide exemplary architectural layouts for handling the bandwidth demanded by the multi-thread multi core configuration.

Figure 1:
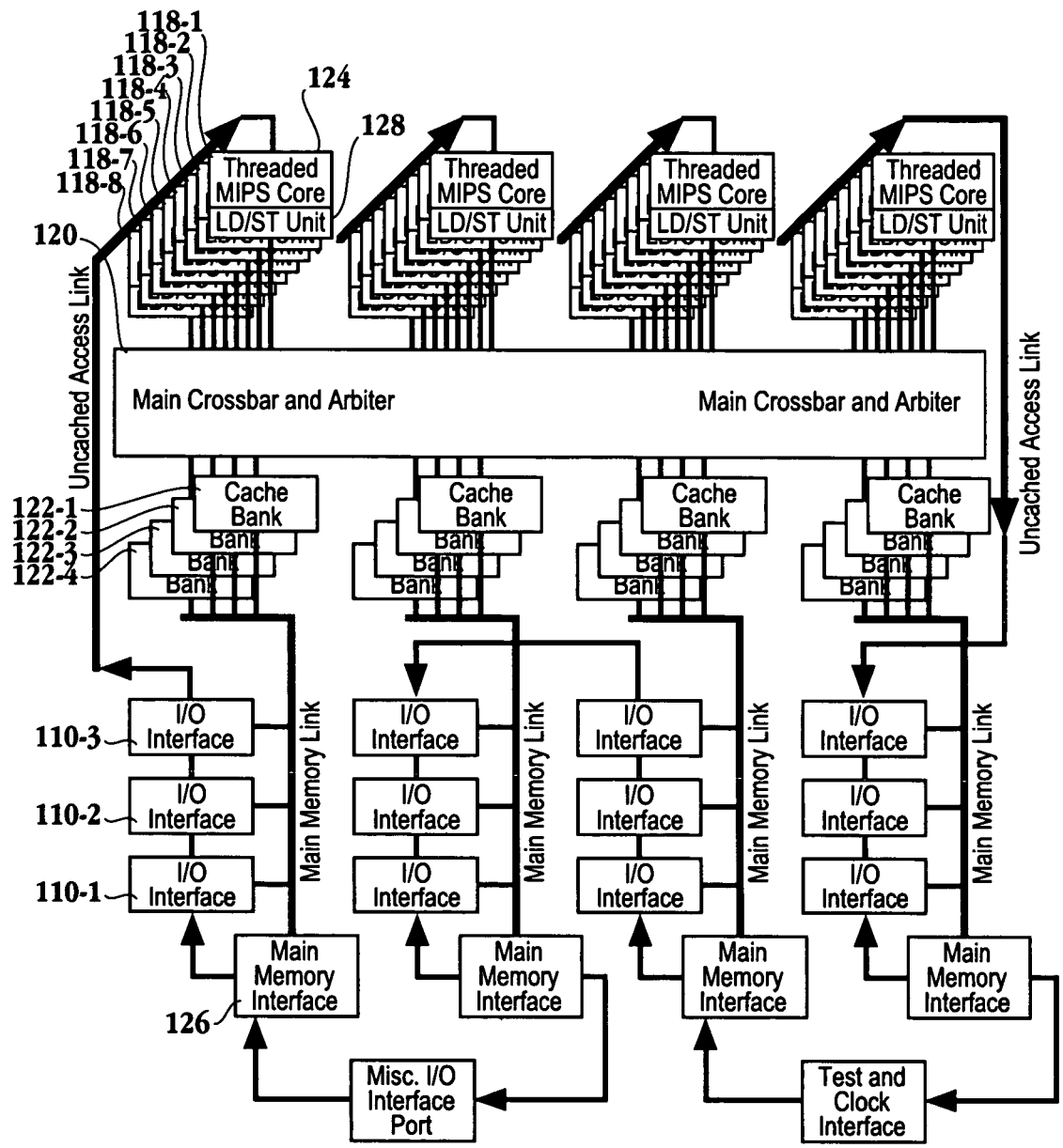
FIG. 1 is a schematic diagram of a processor chip having 4 sets of 8 multi-threaded processor cores in accordance with one embodiment of the invention.

FIG. 1 is a schematic diagram of a processor chip having 4 sets of 8 multithreaded processor cores in accordance with one embodiment of the invention. Threaded cores 118-1 through 118-8 make up the first set of 8 cores of the chip. Each of threaded cores 118-1 through 118-8 include level 1 cache 124. Level 1 cache 124 includes instruction cache (I$) segment and data cache (D$) segment. Load/Store unit 128 is included within each of threaded cores 118-1 through 118-8. It should be appreciated that each of processor cores on the chip include an instruction cache, a data cache and a load store unit. Additionally, processor cores 118-1 through 118-8 are discussed for exemplary purposes, however, the discussion is applicable to all the cores illustrated in FIG. 1. In one embodiment, the load/store unit architecture is similar to that of reduced instruction set computer (RISC) architecture. Of course, the multithreading aspects of the present invention were not accommodated by the RISC architecture. In another embodiment, each of the processor cores are based upon SPARC™ technology of the assignee of the invention. Each processor core 118-1 through 118-8 is in communication with crossbar and arbiter 120. Crossbar 120 is optimized for processor traffic where it is desirable to obtain extremely low latency. Level 2 (L2) cache banks 122-1 through 122-4 are shared by processor cores 118-1 through 118-8. It should be appreciated that by sharing L2 cache banks 122-1 through 122-4 allows for concurrent access to multiple banks at the same time, thereby defining a high bandwidth memory system. In one embodiment, each of L2 cache banks have a size of about 1 megabyte (MB). It should be appreciated that while four L2 cache banks 122-1 through 122-4 are shown in FIG. 1, the invention is not limited to four L2 cache banks. That is, the number of L2 cache banks is sufficient to provide enough bandwidth from the L2 cache to keep all of the threads busy. In one embodiment, each processor core includes 4 threads. Thus, a single processor chip with eight cores will have 32 threads in this configuration. Each L2 cache bank 122-1 through 122-4 is in communication with main memory interface 126 through a main memory link in order to provide access to the main memory. It should be appreciated that while 8 cores are depicted on the processor chip, more or less cores can be included as the FIG. 1 is exemplary and not meant to be limiting.

Still referring to FIG. 1, main memory interface 126 is in communication with input/output (I/O) interface blocks 110-1 through 110-3 which provide uncached access to the threaded cores through the uncached access link. Thus, processor cores 118-1 through 118-8 are enabled to directly access a register in any of I/O devices through I/O interfaces 110-1-110-3 instead of communicating through the memory. It should be appreciated that the I/O interface blocks, main memory interface blocks, miscellaneous I/O interface port blok, and test and clock interface block also drive off-chip pins.

Figure 2:
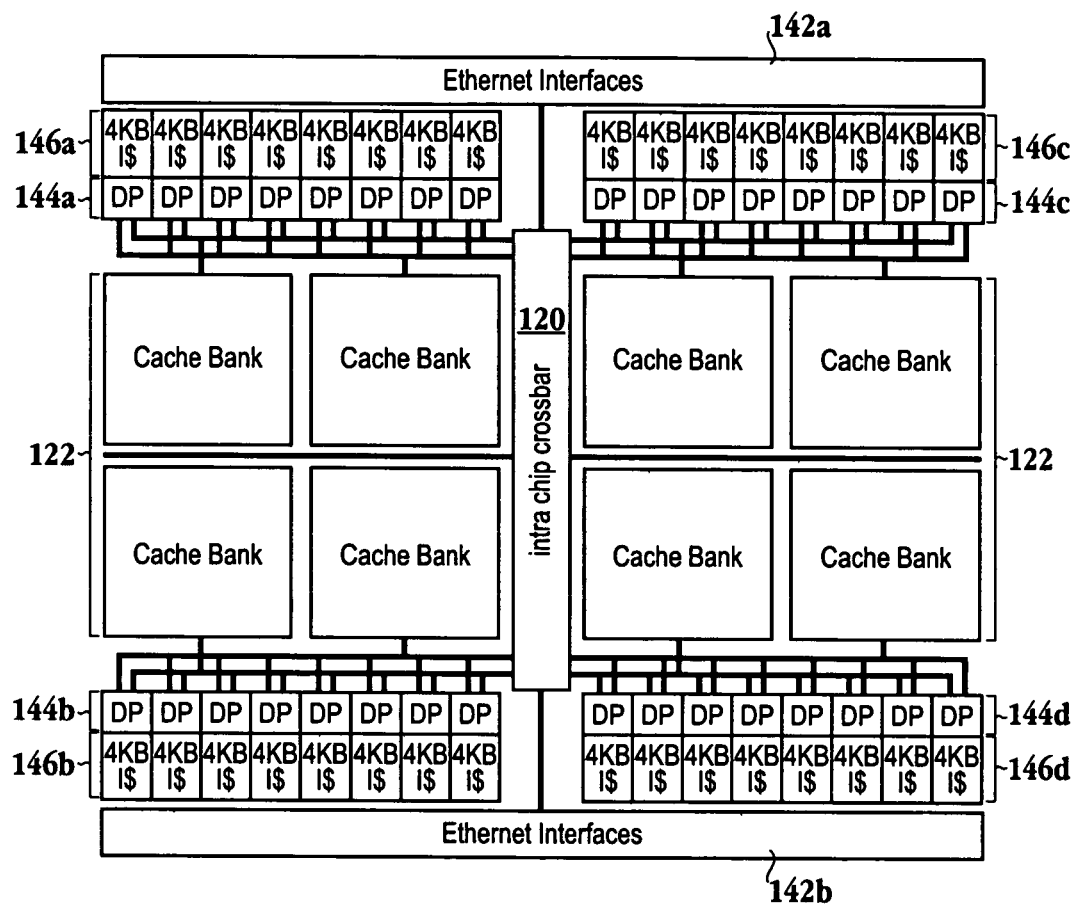
FIG. 2 is an alternative schematic representation of the multi-threaded multi-core processor chip of FIG. 1.

FIG. 2 is an alternative schematic representation of the processor chip of FIG. 1. Here, crossbar 120 is in communication with data pathways 144a-144d, and L2 cache banks 122. It should be appreciated that only 2 sets of cache banks 122 are shown due to limitations of illustrating this configuration in two dimensions. Two additional cache banks are provided, but not shown, so that each data pathway 144a-144d is associated with a cache bank. Ethernet interfaces 142a and 142b provide access to a distributed network. In one embodiment, Ethernet interfaces 142a and 142b are gigabit Ethernet interfaces. Level one cache memories 146a-146d are provided for each of the processor cores associated with data pathways 144a-144d.

It should be appreciated that the processors of FIGS. 1 and 2 issue approximately 10-12 data memory references per cycle into the main cache memory of the chip, along with the occasional local instruction cache miss. Because of the large number of independent 64-bit accesses that must be processed on each cycle, some sort of crossbar mechanism must be implemented between the individual processors and the 16 independently accessible main cache banks. This logic will utilize many long wires, large multiplexers, and high-drive gates. The embodiments described below examine several different configuration options (and their key constituent components) that would allow the building of a network capable of handling the bandwidth requirements that the processor cores demand.

Figure 3A:
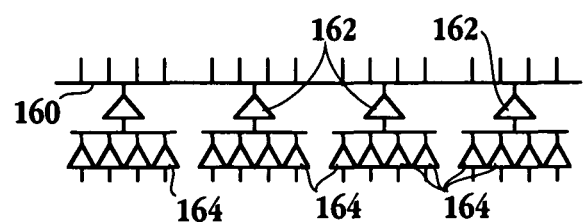
FIGS. 3A through 3C illustrate alternative wiring options associated with the crossbar in accordance with one embodiment of the invention.
Figure 3B:
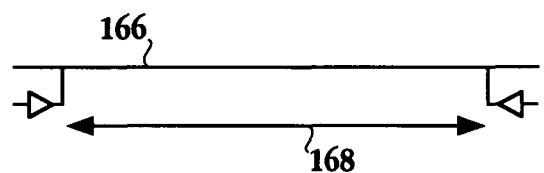
Figure 3C:
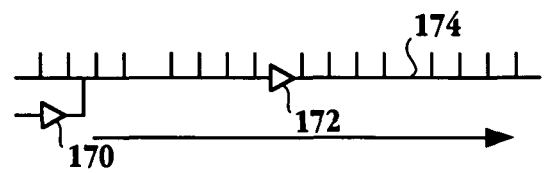

FIGS. 3A through 3C illustrate alternative wiring options associated with the crossbar in accordance with one embodiment of the invention. FIG. 3A requires the least amount of wires to run the crossbar, but the design complexity of the wire drivers is the most complex for the embodiment of FIG. 3A. It should be appreciated that the design complexity is largely proportional to the number of inputs allowed to any single wire. In essence, the choice is between fewer, more electrically complex wires or a larger number of electrically simpler wires. On one hand, the number of wires is a critical issue, as the crossbar wiring paths will probably consist of 2000-5000 wires (which will end up requiring a 1-5 mm wide wiring channel in leading-edge 0.13 µ-0.18 µ-technologies). On the other hand, minimizing the electrical complexity of the wires is also critical because the wires will be difficult to pipeline effectively. As a result, the driver circuitry will need to be designed with single-cycle timing restrictions, therefore, keeping the wiring scheme simple will be beneficial.

The hierarchical multi-input structure of FIG. 3A allows single global line 160 to be driven by many inputs, since it breaks up the line into two or more levels in order to distribute the high output capacitance of the numerous input drivers 162 and 164 over a larger number of smaller wires. Here each line can be driven from one of several inputs and read out from one of several outputs. Because each wire has so many inputs and outputs, each wire can act as any one of several inter-unit routes on the chip. As a result, the chip is able to perform useful work on virtually any cycle, allowing the minimum number of global wires to be strung across the crossbar. It should be appreciated that this configuration allows maximum wire usability. However, this comes at the expense of large numbers of drivers assigned to each wire, as illustrated in FIG. 3A. As a result, it would be difficult to run a crossbar made out of these wires over non-related logic as the transistor space is needed for the crossbar drivers. In addition, due to the large number of inputs, parasitic capacitances from the large output drivers will be high.

FIG. 3B illustrates 2-way point to point lines that form links between units and a central resource, e.g., a section of a distributed arbiter. That is, each line 166 is configured to communicate to and from a central arbiter/crossbar resource. The lines may be run in both directions as indicated by arrow 168, in order to halve the number of wires required, as opposed to a scheme with pairs of one-way wires. The pros and cons of this configuration are somewhat between the other two options. If a distributed arbitration scheme is chosen, and the wiring density must be decreased, then this structure may be optimal. Otherwise, the configurations of FIGS. 3A or 3C may be preferable.

FIG. 3C illustrate unidirectional lines from one input to one or more outputs, in a fixed manner. This scheme requires the largest number of wires, but it offers the simplest and most flexible circuit design. In particular, drivers 170 are just simple inverters, instead of the tri-state drivers of FIG. 3A. Also, simple inverter-based repeaters 172 can be placed at convenient locations along wire 174, if necessary, in order to minimize the wire delay. While the schemes of FIGS. 3A and 3B could also use repeaters, the repeaters would have to be bi-directional and actively switch direction depending upon which way the data was flowing over the line on that cycle. It should be appreciated that the technique of FIG. 3C requires a relatively larger number of wires. However, this requirement could largely be sidestepped by taking advantage of the fact that the simpler, and therefore smaller, driver design would usually allow running the wires right over the processor cores, for the most part. In light of this, the configuration of FIG. 3C is probably the preferable wiring scheme, overall.

Figure 4A:
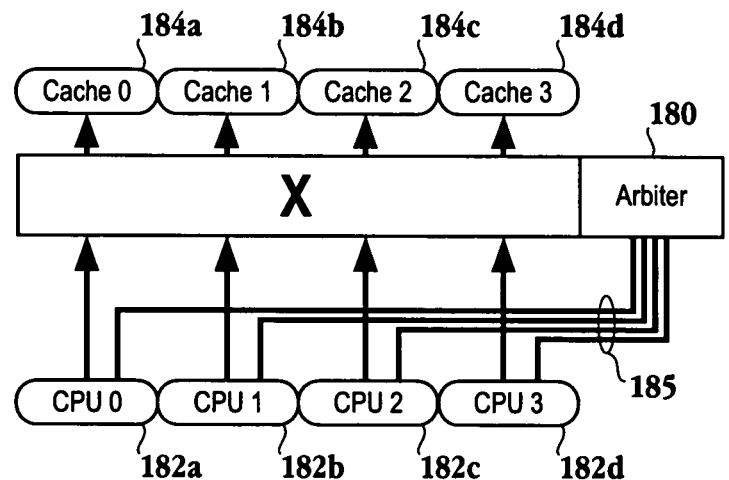
FIGS. 4A through 4C illustrate three alternative arbitration/buffering options for a cross bar in accordance with one embodiment of the invention.
Figure 4B:
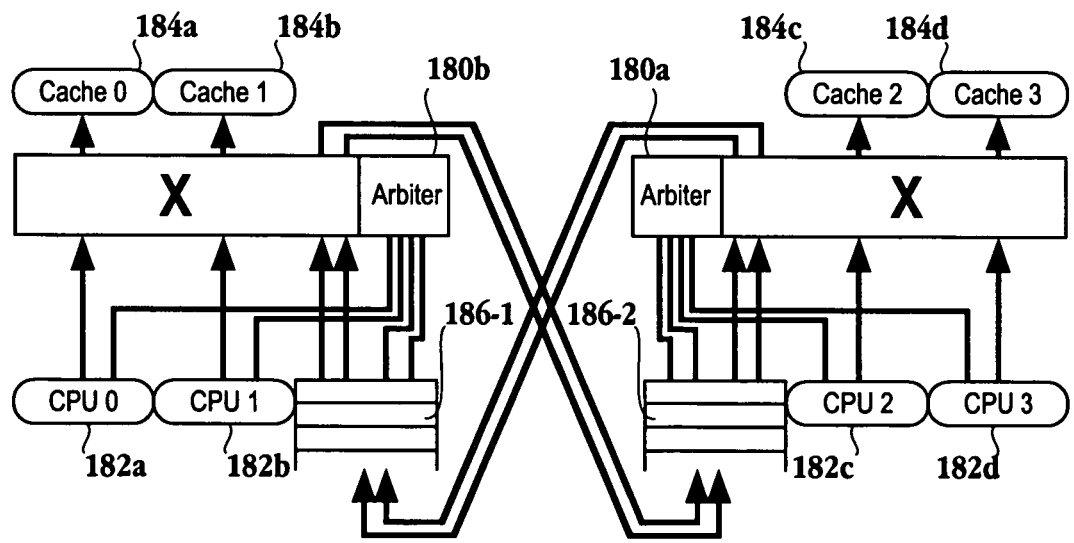
Figure 4C:
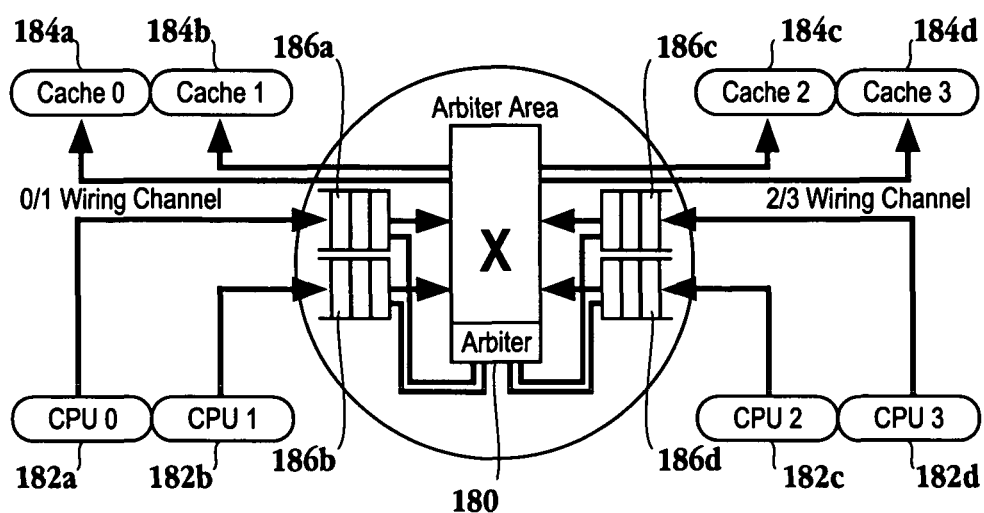

FIGS. 4A-4C illustrate three alternative arbitration/buffering options for a cross bar in accordance with the embodiments of the invention. The alternative arbitration-and-buffering layouts are depicted with a 4×4 CPU to cache subset of the chip for illustrative purposes only, as the options may be applied to any suitable number of CPU to cache memories. Similar to the wiring options, the buffering schemes offer two extreme designs and a hybrid somewhere between the two extremes. It should be noted that FIGS. 4A-4C illustrate the wiring for the forward path from each processor to the cache banks for exemplary purposes, and not the matching return path.

FIG. 4A illustrates the simplest of the three designs. This single, unified system includes crossbar 182 incorporating arbiter 180, where the arbiter is attached to the crossbar in a central location. After processors, CPU0-CPU3, 182a-182d, respectively, send cache bank access requests 185 to the arbiter, the arbiter sorts through the requests and allows several non-colliding requests to continue on every cycle. The "return" from each access is scheduled to be a fixed delay time after the initial "send." This design has the advantage of allowing each processor, 182a-d, to keep most of the information associated with each reference in its own reference list until after the arbitration is granted, since there are no buffers halfway to the destination. Also, unless a cache miss occurs, the access will be in each cache bank, 184a-d, for a fixed time. Hence, it is reasonable to use a single arbitration to handle both the outbound and return trips for the reference. It be appreciated that the return trip arbitrations are simply a delayed form of the outbound trip. The buffering and arbitration advantages to this simple design make it highly desirable, as long as the circuit design can scale up to this size. It should be noted that the wiring options illustrated with reference to FIGS. 3A and 3C would be preferably used to connect the components of FIG. 4A.

FIG. 4C offers an embodiment which is the opposite extreme of FIG. 4A. Here, entire references are sent to buffers 186a-d physically surrounding arbiter 180, which is in communication with corresponding CPU's 182a-d, and is located between two or more separate areas of the chip, such as in the layout illustrated in FIG. 5B. Arbiter 180 is then able to pick and choose references from its numerous input queues 186a-d for forwarding to their destinations. Unlike the other designs, this one implements the forward and "return" accesses using completely independent networks, each with their own arbiters. This design offers the advantage of making all wires to and from the arbiters very short, since the references are brought up into nearby buffers 186a-d before arbitration occurs. Also, this design is fully scalable. For example, by using one or more I/O ports to attach another arbiter instead of another processor or cache bank, provides a 2-node distributed system that can easily be scaled further. However, since every reference sits for an unknown time in at least two buffers, full arbitration must be done on both the forward and the return path for the reference. Also, the configuration of FIG. 4C requires that each reference be buffered into locations that essentially duplicate reference list information, vastly expanding the amount of buffering needed. It should be noted that the wiring options illustrated with reference to FIGS. 3B and 3C would be preferably used to connect the components of FIG. 4C.

FIG. 4B illustrates a hybrid of the two schemes of FIGS. 4A and 4C. While FIG. 4B acts mostly like the distributed model of FIG. 4C, it is also able to connect processors to caches within a node without going through buffering stages, since sends and returns flow over the same network. It should be appreciated that this will have the effect of slightly reducing the buffer overhead. Thus, CPU's 182a and 182b may communicate directly with cache 184a and 184b without accessing a buffer, such as buffers 186-1 and 186-2. However, CPU's 182c and 182d may communicate with caches outside the node, e.g., caches 184a and 184b through arbiter 180a, buffer 186-1, and arbiter 180b. It should be noted that the wiring options illustrated with reference to FIGS. 3A and 3C would be preferably used to connect the components of FIG. 4B.

Figure 5A:
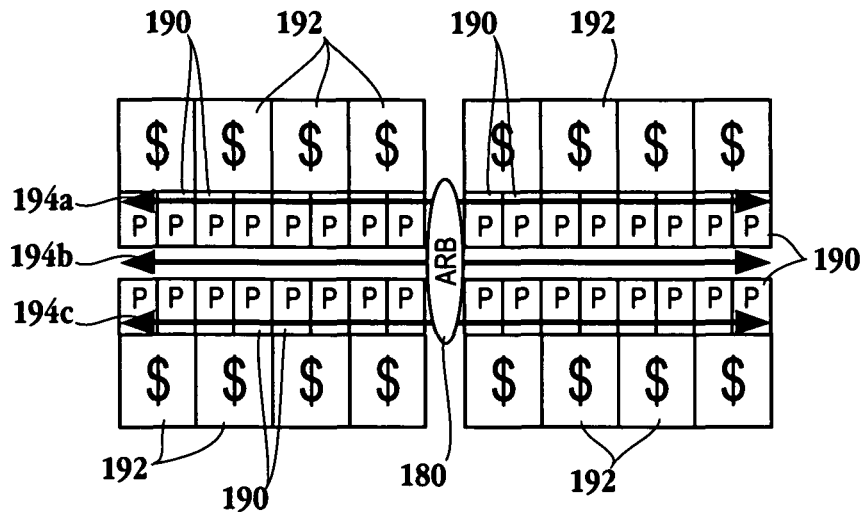
FIGS. 5A and 5B illustrate two exemplary layout options for the chip in accordance with the embodiments on the invention.
Figure 5B:
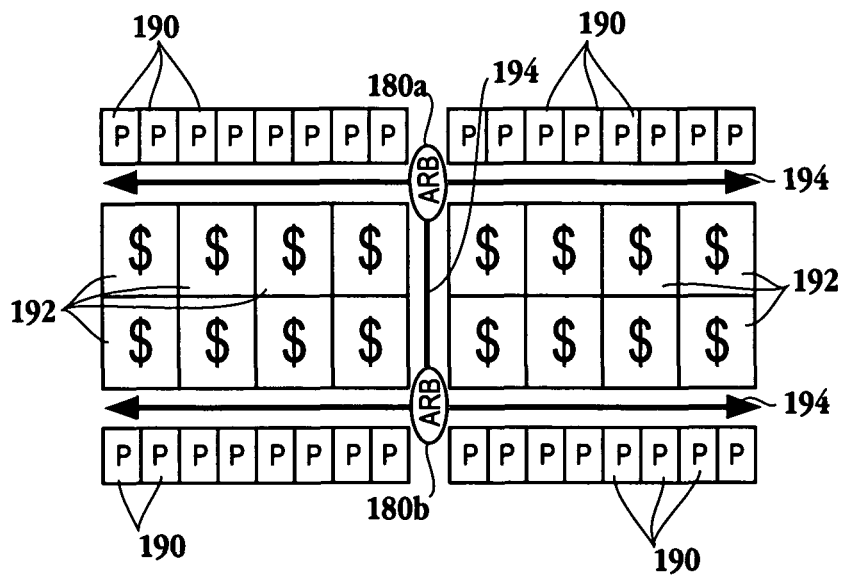

FIGS. 5A and 5B illustrate two layout options for the chip in accordance with the embodiments on the invention. FIG. 5A illustrates processors 190 in the middle of the chip, with the crossbar running between and over the processors, as illustrated by lines 194a-c. This layout is suitable for a centralized design, but would also work well in a more distributed scheme. One benefit of this configuration is that processors 190 are closer to the crossbar, and these processors tend to be making requests on arbiter 180, especially in the completely centralized form of the crossbar of FIG. 4A. Thus, processors 190 define a center region on the chip in which cache memories 192 are located outside the center region. That is, cache memories 192 surround processors 190 on two sides in FIG. 5A.

FIG. 5B illustrates an alternative H shaped layout to the configuration of FIG. 5A. Here cache memories 192 are located in the middle of the configuration (the center region) the crossbar 194 is defined around the cache memories. Processors 190 are located outside the center region and crossbar 194 traverses the area between cache memories 192 and the processors. It should be appreciated that this configuration is more suited to a distributed arbiter arrangement with two or more arbitration nodes, such as the configurations illustrated in FIGS. 4A and 4B.

With the previous set of possible design techniques, a fairly reasonable-size matrix of possible crossbar designs becomes evident, as is tabulated below in TABLE 1. For the distributed cases, the crossbars have been designed to handle a selection of 16 references per cycle, evenly distributed among the processors and cache banks, without backing up their buffers, in one embodiment of the invention. This should handle average workloads, while bursty or uneven accesses will result in some queuing delays. The processor-centered designs, as illustrated in FIG. 5A, assume that the crossbar segments are all in a line, with connections only to their next-door-neighbors, while all four corners of the cache-centered designs of FIG. 5B can communicate with each other using wires running through the middle of the chip to connect the two halves. For the calculation of the number of wires needed by each design, separate address and data buses (the latter replicated in the designs with 1-way wires) are assumed throughout.

TABLE 1

| Layout | Arbiters/Buffer | Xbar Wires | Arbiter Size (#: in × out) | # Wires in Channel | Notes |
|---|---|---|---|---|---|
| Processor Centered | Unified | Hierarchical | 1: 32 × 16 | 400 | |
| | | 1-way | 1: 32 × 16 | 5020 | Best for simplicity and latency |
| | Distributed within, 2 | Hierarchical | 2: 24 × 12 | 3120 | |
| | | 1-way | 2: 24 × 12 | 3950 | Good overall choice |
| | Distributed between, 2 | 2-way | 1: 32 × 16<br>1: 16 × 32* | 2880 | |
| | | 1-way | 1: 32 × 16<br>1: 16 × 32* | 4540 | |
| | Distributed within, 4 | Hierarchical | 2: 22 × 18<br>2: 14 × 10 | 4540 | |
| | | 1-way | 2: 22 × 18<br>2: 14 × 10 | 4120 | |
| | Distributed between, 4 | 2-way | 2: 16 × 10<br>1: 16 × 12<br>2: 10 × 16*<br>1: 12 × 16* | 1680 | |
| | | 1-way | 2: 16 × 10<br>1: 16 × 12<br>2: 10 × 16*<br>1: 12 × 16* | 2646 | Best for arbiter and wiring channel size minimization |
| Cache Centered | Distributed within, 2 | Hierarchical | 2: 24 × 12 | 6240 | |
| | | 1-way | 2: 24 × 12 | 7900 | |
| | Distributed between, 2 | 2-way | 1: 32 × 16<br>1: 16 × 32* | 2880 | |
| | | 1-way | 1: 32 × 16<br>1: 16 × 32* | 4540 | |
| | Distributed within, 4 | Hierarchical | 4: 14 × 10 | 5020 | |
| | | 1-way | 4: 14 × 10 | 4980 | |
| | Distributed between, 4 | 2-way | 2: 20 × 12<br>2: 12 × 20* | 2880 | |
| | | 1-way | 2: 20 × 12<br>2: 12 × 20* | 4540 | |

*These arbiters handle return accesses in the distributed, arbiter-between-regions case, where the access send and return networks are separate.

The numbers obtained here narrow down the list of reasonable options somewhat. Because of the large number of wires involved in the crossbar, hierarchical wiring design are the least desirable due to the large numbers (>50,000) of high-powered tri-state drivers that will be needed to make up the crossbar. While 2-way wires look reasonably good, the lower bandwidth available through 2-way wires will probably make the design contain more cache banks. Because of the already large size of the arbiters, the scheme represented by the two way wires is not as desirable as to the 1 way wired crossbars, thus leaving the 1-way wired crossbars as a preferred configuration. Among the different configurations of the 1 way wired designs, the processor-centered designs are generally superior because they reduce the number of wires in the communication channel.

It should be appreciated that the unified arbitrator crossbar design is simple to implement, with only a single arbiter and set of wires. The unified design also minimizes and fixes the latency of each memory access, since only one crossbar hop is required for any access. The 4-way distributed design with arbiters between sections is best for overall compactness. The 4-way distributed design has several fairly small arbiters and uses its wiring channel space very effectively, but requires that most references hop through several crossbar stages to go from processor to cache and back (2 to 6 per reference). The 2-way distributed design with arbiters associated with each section is about halfway between the two in all respects, and offers a middle ground relative to the unified design and the 4-way distributed design.

In one embodiment, about 1,000 parallel wires per millimeter of silicon exist for wires all on the same metal layer. It will be apparent to one skilled in the art that depending upon the exact design rules for the metal layer(s) used this number will vary and is not meant to be limiting.

In summary, the above described embodiments provide exemplary architecture schemes for the multi-thread multi-core processors. The architecture scheme presents exemplary wiring options, exemplary arbitration and buffering options, exemplary overall layout options, i.e., cache centered vs. processor centered. These architecture schemes are configured to handle the bandwidth necessary to accommodate the multi-thread multi-core processor configuration.

Furthermore, the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A processor chip, comprising:
a plurality of processing cores, each of the processing cores being multi-threaded, the plurality of processing cores being located in a center region of the processor chip;
a plurality of cache bank memories; and
a crossbar having a first crossbar segment and a second crossbar segment, the first crossbar segment enabling communication between a first portion of the plurality of processing cores and the plurality of cache bank memories, the first crossbar segment including an arbiter configured to sort multiple requests received from the first portion of the plurality of processing cores, and the second crossbar segment enabling communication between a second portion of the plurality of processing cores and the plurality of cache bank memories, the second crossbar segment including an arbiter configured to sort multiple requests received from the second portion of the plurality of processing cores.

2. The processor chip of claim 1, further comprising:
the plurality of cache bank memories in communication with the plurality of processing cores through the crossbar, the plurality of cache bank memories located outside the center region;
a plurality of input/output (I/O) interface modules in communication with a main memory interface and providing a link to the plurality of processing cores, the link bypassing the plurality of cache bank memories and the crossbar; and
threading hardware configured to enable each of the plurality of processing cores to switch from a first thread to a second thread in a manner hiding delays caused by cache accesses.

3. The processor chip of claim 1, wherein each of the plurality of processing cores include,
a load/store unit having a master reference list, the master reference list including a register file.

4. The processor chip of claim 3, wherein the register files include,
memory access handling registers for memory references associated with a respective core.

5. The processor chip of claim 3, wherein the master reference list is configured to associate an address of a memory reference with both a respective thread and a respective register number.

6. The processor chip of claim 1, wherein the cache bank memories are single ported static random access memories.

7. The processor chip of claim 1, wherein each of the plurality of cache bank memories have a size of about one megabyte.

8. The processor chip of claim 1, wherein a wiring configuration between the crossbar, the plurality of processing cores and the plurality of cache bank memories includes a global line driven by a plurality of inputs.

9. The processor chip of claim 1, wherein a wiring configuration between the crossbar, the plurality of processing cores and the plurality of cache bank memories includes a unidirectional line extending from an input source to one or more output sources, wherein the unidirectional line is capable of driving multiple outputs.

10. The processor chip of claim 1, wherein the first crossbar segment accesses a portion of the plurality of cache bank memories through the second crossbar segment.

11. The processor chip of claim 10, wherein access to the portion of the plurality of cache bank memories is through a buffer in communication with the arbiter of the second crossbar segment.

12. A processor chip, comprising:
a plurality of cache bank memories located in a center region of the processor chip;
a plurality of processing cores, each of the processing cores being multi-threaded, the plurality of processing cores being located outside of the center region, each of the plurality of processing cores including a load/store unit; and
a crossbar having a first crossbar segment and a second crossbar segment, the first crossbar segment enabling communication between a first portion of the plurality of processing cores and the plurality of cache bank memories, the first crossbar segment including an arbiter configured to sort multiple requests received from the plurality of processing cores, the second crossbar segment enabling communication between a second portion of the plurality of processing cores and the plurality of cache bank memories, the second crossbar segment including an arbiter configured to sort multiple requests received from the second portion of the plurality of processing cores, wherein a wiring configuration between each crossbar, the plurality of processing cores and the plurality of cache bank memories includes a unidirectional line extending from an input source to one or more output sources, wherein the unidirectional line is capable of driving multiple outputs.

13. The processor chip of claim 12, wherein the crossbar includes two or more arbiter nodes.

14. The processor chip of claim 13, wherein each of the two or more arbiters are associated with a buffer configured to store references for cache bank access requests.

15. The processor chip of claim 12, wherein a wiring configuration between the crossbar, the plurality of processing cores and the plurality of cache bank memories includes a global line driven by a plurality of inputs.

16. A server, comprising:
an application processor chip, the application processor chip, including:
a plurality of cache bank memories located in a center region of the processor chip;
a plurality of processing cores, each of the processing cores being multi-threaded, the plurality of processing cores being located outside of the center region, each of the plurality of processing cores including a load/store unit; and
a crossbar having a first crossbar segment and a second crossbar segment, the first crossbar segment enabling communication between a first portion of the plurality of processing cores and the plurality of cache bank memories, the first crossbar segment including an arbiter configured to sort multiple requests received from the plurality of processing cores, the second crossbar segment enabling communication between a second portion of the plurality of processing cores and the plurality of cache bank memories, the second crossbar segment including an arbiter configured to sort multiple requests received from the second portion of the plurality of processing cores, wherein a wiring configuration between the crossbar, the plurality of processing cores and the plurality of cache bank memories includes a unidirectional line extending from an input source to one or more output sources, wherein the unidirectional line is capable of driving multiple outputs.

17. The server of claim 16, wherein the crossbar includes two or more arbiter nodes.

18. The server of claim 17, wherein each of the two or more arbiters are associated with a buffer configured to store references for cache bank access requests.

19. The server of claim 16, wherein a wiring configuration between the crossbar, the plurality of processing cores and the plurality of cache bank memories includes a global line driven by a plurality of inputs.

* * * * *